US008965923B1

(12) United States Patent
Salcedo

(10) Patent No.: US 8,965,923 B1
(45) Date of Patent: *Feb. 24, 2015

(54) METHOD AND APPARATUS FOR IDENTIFYING AND RESOLVING CONFLICTING DATA RECORDS

(75) Inventor: Jonathan Salcedo, San Francisco, CA (US)

(73) Assignee: Asurion, LLC, Nashville, TN (US)

( * ) Notice: Subject to any disclaimer, the term of this patent is extended or adjusted under 35 U.S.C. 154(b) by 370 days.

This patent is subject to a terminal disclaimer.

(21) Appl. No.: 13/412,525

(22) Filed: Mar. 5, 2012

Related U.S. Application Data

(63) Continuation of application No. 12/253,412, filed on Oct. 17, 2008, now Pat. No. 8,131,759.

(60) Provisional application No. 60/980,980, filed on Oct. 18, 2007.

(51) Int. Cl.
*G06F 17/30* (2006.01)

(52) U.S. Cl.
USPC ............................................ 707/780; 707/610

(58) Field of Classification Search
CPC .................... G06F 17/30598; G06F 17/30495; G06F 17/30985; G06F 2207/025; G06F 11/188; G06F 11/3072
USPC ................................................. 707/780, 610
See application file for complete search history.

(56) References Cited

U.S. PATENT DOCUMENTS

| | | | | |
|---|---|---|---|---|
| 7,152,060 | B2 * | 12/2006 | Borthwick et al. | 707/770 |
| 7,509,352 | B1 * | 3/2009 | Hartwell et al. | 1/1 |
| 7,657,506 | B2 * | 2/2010 | Levin | 707/999.002 |
| 7,720,846 | B1 * | 5/2010 | Bayliss | 707/736 |
| 8,006,204 | B2 | 8/2011 | Killian et al. | |
| 8,032,546 | B2 * | 10/2011 | Arasu et al. | 707/769 |
| 8,131,759 | B2 * | 3/2012 | Salcedo | 707/780 |
| 8,166,033 | B2 | 4/2012 | Kazi et al. | |
| 8,463,750 | B2 * | 6/2013 | Kazi et al. | 707/650 |
| 2003/0023619 | A1 * | 1/2003 | Beyda | 707/203 |
| 2004/0044799 | A1 * | 3/2004 | Sivaraman et al. | 709/253 |
| 2004/0172393 | A1 * | 9/2004 | Kazi et al. | 707/6 |
| 2004/0181526 | A1 * | 9/2004 | Burdick et al. | 707/6 |
| 2004/0193578 | A1 * | 9/2004 | Yaeger | 707/3 |
| 2005/0216443 | A1 | 9/2005 | Morton et al. | |

(Continued)

OTHER PUBLICATIONS

Awekar and Samatova (2009), "Fast matching for all pairs similarity search," IEEEWIC/ACM International Conference on Web Intelligence and Intelligent Agent Technology—Workshops, 1:295-300.

(Continued)

*Primary Examiner* — Thanh-Ha Dang
(74) *Attorney, Agent, or Firm* — Fish & Richardson P.C.

(57) ABSTRACT

A method and apparatus for identifying and resolving conflicting data records are disclosed. The individual data fields of a master record are compared with the corresponding data fields of each source record in a particular data set. For each, one of various matching algorithms is used to assign a field matching score indicating the extent to which the data in the two data fields matches. The particular algorithm used to determine the extent of a match and to assign the corresponding score is dependent on the type of the data field. Once all of the data fields for a particular source record have been analyzed, the sum of the field matching scores is tallied to determine an overall record matching score for that particular source record.

9 Claims, 10 Drawing Sheets

(56) References Cited

U.S. PATENT DOCUMENTS

| | | | | |
|---|---|---|---|---|
| 2006/0026413 | A1* | 2/2006 | Ramkumar | 712/300 |
| 2006/0174017 | A1* | 8/2006 | Robertson | 709/229 |
| 2007/0282827 | A1* | 12/2007 | Levin | 707/5 |
| 2008/0244008 | A1* | 10/2008 | Wilkinson et al. | 709/205 |
| 2008/0319983 | A1* | 12/2008 | Meadows | 707/5 |
| 2009/0106245 | A1 | 4/2009 | Salcedo | |
| 2010/0094910 | A1 | 4/2010 | Bayliss | |
| 2010/0106724 | A1 | 4/2010 | Anderson | |
| 2012/0226692 | A1* | 9/2012 | Kazi et al. | 707/737 |
| 2012/0278349 | A1* | 11/2012 | Bidlack | 707/758 |
| 2013/0036119 | A1* | 2/2013 | Yakout et al. | 707/737 |
| 2013/0132410 | A1* | 5/2013 | Rineer | 707/758 |

OTHER PUBLICATIONS

Brady and Verdú 1991), "A semiclassical analysis of optical code division multiple access," IEEE Transactions on Communications, 39(1):85-93.

Bucknam, et al. (2006), "Refuting phylogenetic relationships," Biology Direct, 1:26, 19 pp.

David, et al. (2003), "Secure identity authentication and logical access control for airport information systems," IEEE 37th Annual International Carnahan Conference on Oct. 14-16, 2003, pp. 314-320.

Dinerstein, et al. (2008), "Learning-based fusion for data deduplication," Machine Learning and Applications, ICMLA '08, Seventh International Conference on Dec. 11-13, 2008, pp. 66-71.

Eği, et al. (2010), "Automatic detection of periodic limb movements in sleep (PLMS) disorder by TMS320C6713 digital signal processing card," Signal Processing and Communications Applications Conference (SIU), IEEE 18th, pp. 185-188.

Ellis, et al. (1996), "Viewing difficulties with head-mounted aids for mechanical assembly using nearby virtual objects," Proceedings EFTA '96, IEEE Conference on Emerging Technologies and Factory Automation, Piscataway, NJ, 1996, pp. 418-422.

Ezeife and Udechukwu (2003), "Data position and profiling in domain-independent warehouse cleaning," in Proc. ICEIS (1), 7 pp.

Fink, et al. (1994), "Process technology for InGaAs/InAlAs modulation doped field effect transistors on InP substrates," J. Vac. Sci. Technol. B, 12(6):3332-3336.

Gill and Goldacre (2003), "English national record linkage of hospital episode statistics and death registration records," Report to the Department of Health, National Centre for Health Outcomes Development, Unit of Health-care Epidemiology, University of Oxford, (available at http://nchod.uhce.ox.ac.uk/NCHOD%20Oxford%20E5%20Report%201st%20Feb_VerAM2.pdf, 103 pages.

Gupta, et al. (2008), "Meliorated approach for extracting bilingual terminology from Wikipedia," Proceedings of 11th International Conference on Computer and Information Technology, Dec. 25-27, 2008, pp. 560-565.

Harmse, et al. (2006), "Speaker recognition score-normalization to compensate for SNR and duration," IEEE Odyssey, The Speaker and Language Recognition Workshop, pp. 1-8.

Koo, et al. (2011), "Effects of unpopular citation fields in citation matching performance," Information Science and Applications (ICISA), International Conference on Apr. 26-29, 2011, 7 pp.

Koudymov, et al. (2002), "p-channel GaN/AlGaN heterostructure junction field effect transistor," Device Research Conference, 60th DRC Conference Digest, pp. 29-30.

Lim, et al. (2009), "Magnetocardiogram difference between healthy subjects and ischemic heart disease patients," IEEE Transactions on Magnetics, 45(6):2890-2893.

Lin (2010), "Personal speech calendar with timing keywords aware and schedule time prediction functions," TENCOM 2010-2010 IEEE Region 10 Conference, pp. 746-750.

Lorenz and Kadel (1991), "Propagation measurements using a digital channel sounder matched to the GSM-system bandwidth," Communications, IEEE International Conference on Jun. 23-26, 1991; vol. 2, pp. 548-552.

Manyakov and Van Hulle (2008), "Discriminating visual stimuli from local field potentials recorded with a multi-electrode array in the monkey's visual cortex," Machine Learning for Signal Processing, IEEE Workshop on Oct. 16-19, 2008, p. 157-162.

Mills, et al. (2003), "CW Hi laser based on a stationary inverted Lyman population formed from incandescently heated hydrogen gas with certain Group I catalysts," IEEE Transactions on Plasma Science 31(2):236-247.

Naumann, et al. (2006), "Data fusion in three steps: resolving schema, tuple, and value inconsistencies," IEEE Data Engineering Bulletin, 29(2):21-31.

Ogawa, et al. (2007), "Evaluation of cognitive function for amyotrophic lateral sclerosis with event-related potentials," IEEE/ICME International Conference on Complex Medical Engineering, pp. 1535-1541.

On, et al. (2007), "Group linkage," Communications, IEEE 23rd International Conference on Data Engineering, Apr. 15-20, 2007, pp. 496-505.

Pitman, et al. (2001), "Flashfood: a 3D field-based similarity search and alignment method for flexible molecules," Journal of Computer-Aided Molecular Design, 15(7):587-612.

Platenik, et al. (2002), "In vivo quantification of retraction deformation modeling for updated image-guidance during neurosurgery," IEEE Transactions on Biomedical Engineering, 49(8):823-835.

Poh, et al. (2010), "Group-specific score normalization for biometric systems," Computer Vision and Pattern Recognition Workshops, IEEE Computer Society Conference on Jun. 13-18, 2010, pp. 38-45.

Qi, et al. (2008), "Study on behavior of female rat 3 months after electromagnetic pulse irradiation," IEEE, pp. 998-1000.

Rahm and Bernstein (2001), "A survey of approaches to automatic schema matching,", The VLDB Journal, 10:334-350.

Rasmussen (2006), "Free-field reciprocity calibration of laboratory standard (LS) microphones using a time selective technique," J. Acoust. Soc. Am., vol. 120, No. 5, Pt. 2, pp. 3232-3233.

Salarian et al. (2003), "An ambulatory system to quantify bradykinesia and tremor in Parkinson's disease," Proc of the 4th Annual IEEE Conference on Information Technology Applications in Biomedicine, pp. 35-38.

Sarawagi, et al. (2009), "Efficient top-K count queries over imprecise duplicates," in EDBT '09 Proceedings of the 12th International Conference on Extending Database Technology: Advances in Database Technology, 12 pp.

Shen (2006), "Unsupervised record extraction for the world wide web," Aug. 30, 2006, 26 pp.

Si, et al. (2001), "Mining the neural code of a guinea pig auditory cortex," IEEE Proceedings, International Conferences on Info-tech and Info-net, 3:84-89.

Smith, et al. (2002), "Pulsed power research at Loughborough University," IEEE, pp. 532-535.

van Velden and Smoorenburg (1991), "Vowel recognition in noise for male, female and child voices," Acoustics, Speech, and Signal Processing, International Conference on Apr. 14-17, 1991, Toronto, Ontario, Canada, pp. 989-992.

Vick and Huynh (2011), "The effects of standardizing names for record linkage: evidence from the United States and Norway," Historical Methods, 44(1):15-24.

Wick, et al. (2008), A unified approach for schema matching, coreference and canonicalization, Proceedings of the 14th ACM SIGKDD International Conference on Knowledge Discovery and Data Mining, Aug. 24-27, 2008, Las Vegas, Nevada, pp. 722-730.

Wilson (2011), "Genealogical record linkage: features for automated person matching," RootsTech, 10 pp.

Wong and Chuah (1994), "A hybrid approach to address normalization," IEEE Expert, 9(6):38-45.

Youtie, et al. (2009), "Blind matching versus matchmaking: comparison group selection for highly creative researchers," in Atlanta Conference on Digital Object Identifer, 10 pp.

* cited by examiner

RECORD SET A

RECORD SET B

| RECORD PAIRING | RECORD MATCHING SCORE |
|---|---|
| (A1,B1) ⟷ | 7 |
| (A1,B2) ⟷ | 0 |
| (A1,B3) ⟷ | 1 |
| (A1,B4) ⟷ | 1 |
| (A1,B5) ⟷ | 0 |
| (A1,B6) ⟷ | 85 |
| (A1,B7) ⟷ | 0 |
| (A1,B8) ⟷ | 3 |
| (A2,B1) ⟷ | 7 |
| (A2,B2) ⟷ | 0 |
| (A2,B3) ⟷ | 0 |
| (A2,B4) ⟷ | 2 |
| (A2,B5) ⟷ | 0 |
| (A2,B6) ⟷ | 0 |
| (A2,B7) ⟷ | 0 |
| (A2,B8) ⟷ | 0 |
| (A3,B1) ⟷ | 2 |
| (A3,B2) ⟷ | 98 |
| (A3,B3) ⟷ | 0 |
| (A3,B4) ⟷ | 0 |
| (A3,B5) ⟷ | 0 |
| (A3,B6) ⟷ | 0 |
| (A3,B7) ⟷ | 1 |
| (A3,B8) ⟷ | 5 |
| (A4,B1) ⟷ | 9 |

. . .

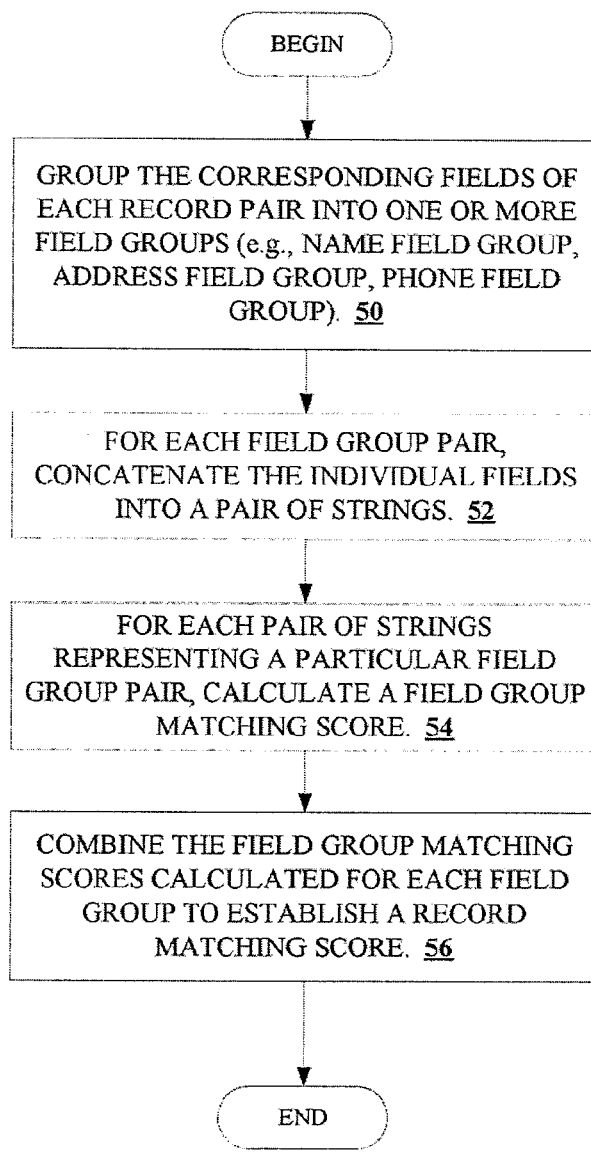
FIG. 5 METHOD FOR CALCULATING RECORD MATCHING SCORE)

RECORD A1

| FIRST NAME | ROB |
| --- | --- |
| LAST NAME | HILLENGERG |
| ADDRESS (STREET) | 101 El Camino Real |
| ADDRESS (CITY) | Reno |
| ADDRESS (STATE) | NV |
| ADDRESS (ZIP) | 89505 |
| EMAIL 1 | Bhillenb@yahoo.com |
| EMAIL 2 | bobh@work.com |
| TELEPHONE WORK | (702) 439-9087 |
| TELEPHONE MOBILE | (702) 123-1395 |

RECORD B1

| FIRST NAME | ROBERT |
| --- | --- |
| LAST NAME | HILLENGERG |
| ADDRESS (STREET) | 101 El Camino Real |
| ADDRESS (CITY) | Reno |
| ADDRESS (STATE) | NV |
| ADDRESS (ZIP) | 89505 |
| EMAIL 1 | Bhillenb@yahoo.com |
| EMAIL 2 | bobh@work.com |
| TELEPHONE WORK | (609) 258-6593 |
| TELEPHONE MOBILE | (702) 123-1395 |

60, 62, 64, 66

RECORD MATCHING SCORE = FIELD GROUP MATCHING SCORE (NAME FIELD GROUP)
+ FIELD GROUP MATCHING SCORE (ADDRESS FIELD GROUP)
+ FIELD GROUP MATCHING SCORE (EMAIL FIELD GROUP)
+ FIELD GROUP MATCHING SCORE (PHONE FIELD GROUP)

FIG. 6

CALCULATING "UNIQUENESS" COMPONENT
EXAMPLE 1:
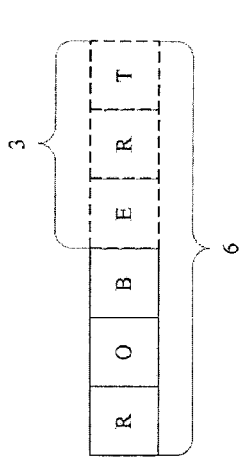
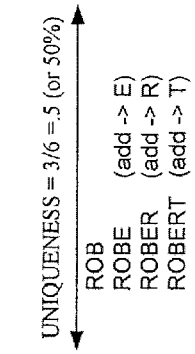
UNIQUENESS = 3/6 = .5 (or 50%)
ROB
ROBE  (add -> E)
ROBER (add -> R)
ROBERT (add -> T)
EXAMPLE 2:
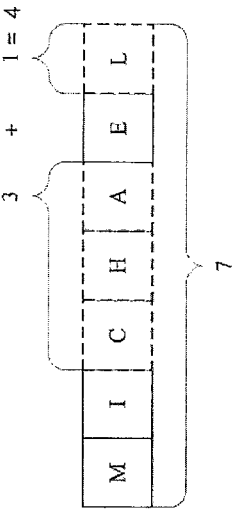
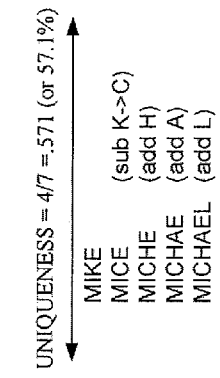
UNIQUENESS = 4/7 = .571 (or 57.1%)
MIKE
MICE    (sub K->C)
MICHE   (add H)
MICHAE  (add A)
MICHAEL (add L)
EXAMPLE 3:
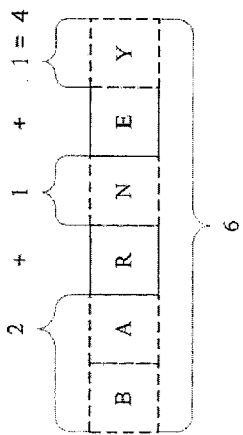
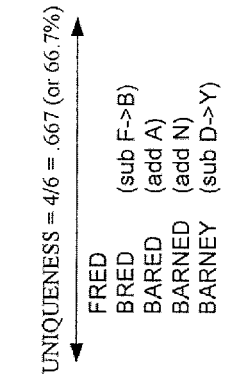
UNIQUENESS = 4/6 = .667 (or 66.7%)
FRED
BRED   (sub F->B)
BARED  (add A)
BARNED (add N)
BARNEY (sub D->Y)
FIG. 8

METHOD AND APPARATUS FOR IDENTIFYING AND RESOLVING CONFLICTING DATA RECORDS

CROSS-REFERENCE TO RELATED APPLICATIONS

This application is a continuation of U.S. patent application Ser. No. 12/253,412, filed Oct. 17, 2008, which claims the benefit of U.S. Provisional Patent Application No. 60/980,980, filed Oct. 18, 2007. The entire disclosure of both of the prior applications is hereby incorporated by reference.

FIELD OF THE INVENTION

The present invention generally relates to data synchronization techniques. More specifically, the present invention relates to a method and apparatus for identifying duplicate and/or conflicting data records (e.g., contact information), and resolving issues related thereto.

BACKGROUND

With the increasing popularity of portable, wireless devices (e.g., laptop computers, mobile phones, personal digital assistants (PDAs), handheld global positioning system (GPS) devices, and so on), users have an increased need to synchronize data. For instance, a user may store data—such as personal and/or business contact information—on a personal computer (PC) or on a server of a web-based service. It is often desirable to synchronize this data with data stored on a portable device, such that a copy of the data is available on the wireless device for access by the user when on the move. Similarly, a user may want to synchronize data so that data entered on a portable device is backed-up or archived at a centrally located device. As any one of several devices may be used to input data, it is often the case that data conflicts arise. For example, a user may utilize a portable device to input a new telephone number for one of his or her contacts, thereby creating a data conflict between the new telephone number (as entered at the portable device) and the previous telephone number (as stored on the centralized PC or web-based service).

In order to synchronize two data records of two data sets, it is first necessary to identify two data records that match or partially match, such that the data associated with each record can be analyzed to determine whether any conflicts exist with respect to its matching or partially matching counterpart. This process is generally referred to as "matching."

One method of matching records is to assign each data record a unique identifier, which is maintained with the data record at each device. Accordingly, two records are considered to match when they have the same identifier. However, it is not always the case that each user device supports the use of unique record identifiers. Many devices simply do not support unique record identifiers. Furthermore, many devices modify the record identifier when data items are added or deleted to a particular record, or field. When unique record identifiers are not implemented and assigned to each data record, a different method of identifying matching records and resolving conflicts is required.

BRIEF DESCRIPTION OF THE DRAWINGS

The accompanying drawings, which are incorporated in and constitute a part of this specification, illustrate an implementation of the invention and, together with the description, serve to explain the advantages and principles of the invention.

FIG. 5 illustrates a method for calculating a record matching score for a pair of records, according to an embodiment of the invention.

FIG. 6 illustrates an example of how a record matching score may be calculated, according to an embodiment of the invention, for a pair of records.

FIG. 8 illustrates various examples of how a uniqueness score is calculated for a grouping of fields, according to an embodiment of the invention.

DESCRIPTION

As presented herein, the invention is described in the context of a contact management application—for example, an application used to enter, store and manage personal and/or business contact information on one or more user devices. However, the present invention should not be construed as being limited to this context. Those skilled in the art will appreciate that the present invention is applicable in a wide variety of other contexts as well, particularly in those contexts involving record synchronization.

Consistent with one embodiment of the invention, an apparatus and method for identifying "matching" records in two record sets is provided. As used herein, the term "matching" does not necessarily mean that two elements (e.g., records) are identical. Instead, two elements are said to "match" when a score calculated with a matching algorithm (as described herein) meets or exceeds a threshold score, and/or when a score is the highest of all scores calculated with a particular matching algorithm. The matching algorithms described herein have a variety of uses in different applications, to include synchronizing the data fields of matching records from two record sets, and resolving any conflicting data in the data fields of two "matching" records.

The matching algorithms described herein can be executed or performed on various nodes of a computer network. For example, in one embodiment of the invention, the matching algorithms may be executed or performed on one or more handsets or mobile devices. Alternatively, the matching algorithms may be executed or performed at a centralized data storage and processing center, such as a network-based contact information management server. It is often the case that a centralized node or server is referred to as a master device, whereas a client device, such as a handset, is referred to as a source device. Accordingly, a record associated with or stored on a centralized server may be referred to as a master record, whereas a record associated with, or stored on, a client device may be referred to as a source record. In any case, the matching algorithms described herein are designed to be commutative, such that the algorithms are not dependent upon whether a record is a "master" record or a "source" record.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 1:
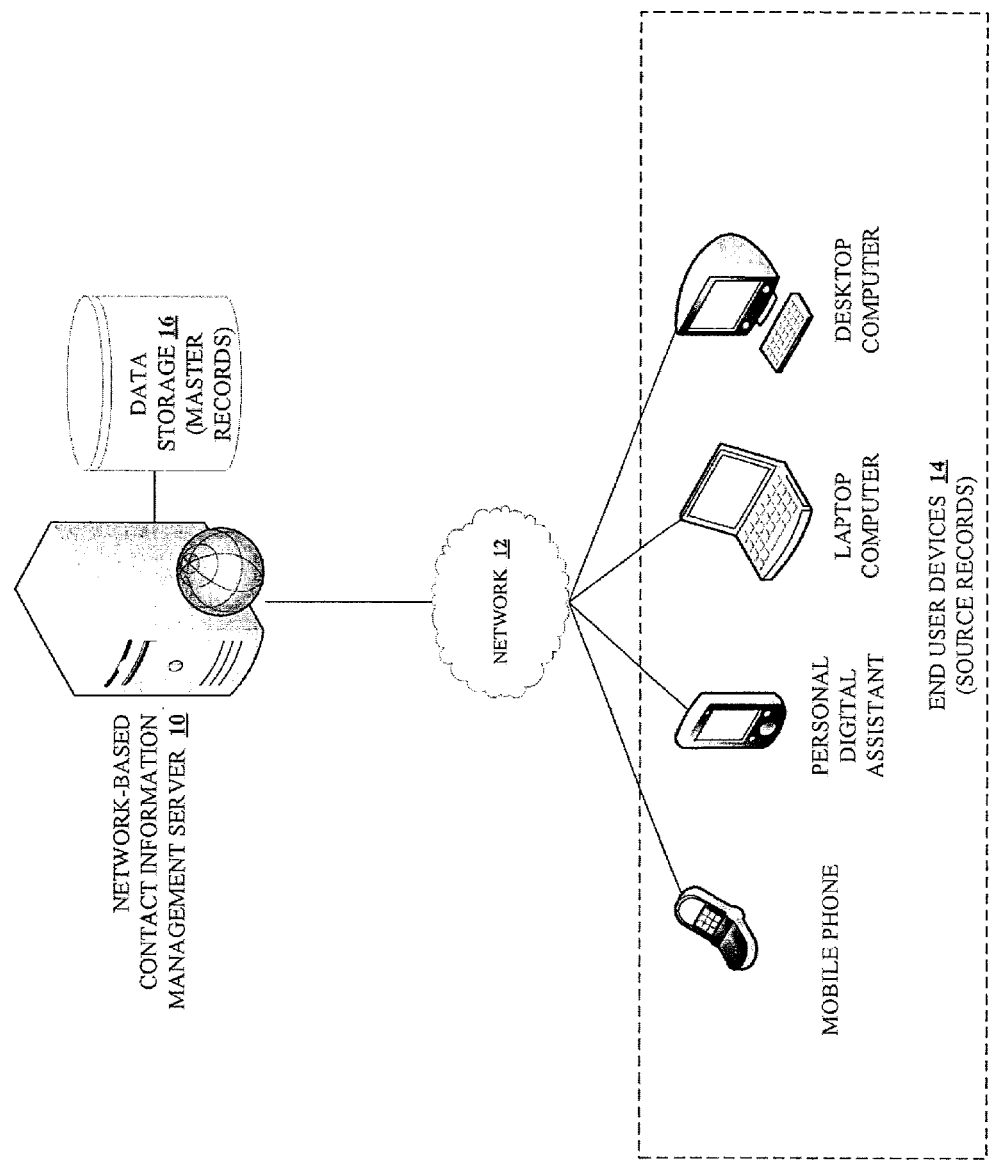
FIG. 1 illustrates a variety of end user devices, which may be configured to operate with, and synchronize data stored at, a network-based data service, according to an embodiment of the invention.

FIG. 1 illustrates a variety of end user devices, which may be configured to operate with, and synchronize data stored at, a network-based data service, according to an embodiment of the invention. As illustrated in FIG. 1, a network-based contact information management server 10 is configured to provide a data service over a network 12 to a variety of end user devices 14. In this case, the contact information management server 10 is a master device, while each end user device is a source device. Accordingly, the records associated with and stored at the contact information management server 10 are considered to be master records, while the records associated with and stored at each end user device 14 are source records. In one embodiment of the invention, the contact information management server 10 is coupled to one or more data storage devices 16, where master records are stored.

The network 12 used for communicating data between the network-based contact information management server 10 and the various end user devices 14 will vary depending upon the particular implementation. Accordingly, the invention is independent of any particular network, or communications or networking protocols. In one embodiment of the invention, the network may be a wireless data network operated by a wireless services provider or operator. Alternatively, the network may be a wired (e.g., Ethernet-based) or wireless (e.g., 802.11 a/b/g/n, or related standard) network. In one embodiment, the network may 12 may simply be a common communication protocol shared between the server 10 and the end user device 14, and a cable (e.g., Universal Serial Bus (USB) cable).

Generally, a user will interact with one or more end user devices by entering various information, such as contact information for personal and/or business contacts. On occasion, a synchronization process will be initiated (e.g., either automatically, or manually), and the contact information stored at a particular end user device will be synchronized with the contact information stored at the contact information management server 10, or vice versa. Accordingly, the invention provides an easy and simple method for backing up, and restoring data. For example, data entered at one handset may be communicated to the server 10, where the data records are "matched" with existing data records and any conflicts resolved, and then at a later time, the data may be restored to the same, or a different handset.

In one embodiment of the invention, the matching analysis and the conflict resolution analysis occur at the master device (e.g., the contact information management server 10). Accordingly, during the synchronization process the source records (or a portion thereof) are communicated from an end-user device to the contact information management server 10 over the network 12. In an alternative embodiment, the matching and conflict resolution analysis may occur on the end user device. In this case, the master records (or a portion thereof) may be communicated from the contact information management server 10 to the end user device. Furthermore, in one embodiment of the invention, multiple synchronization modes may be supported, such that a user may perform a full synchronization, in which case all source records are communicated to the master device, or a partial synchronization, in which case only records which have been modified since the last synchronization process was performed are communicated to the master device.

Figure 2:
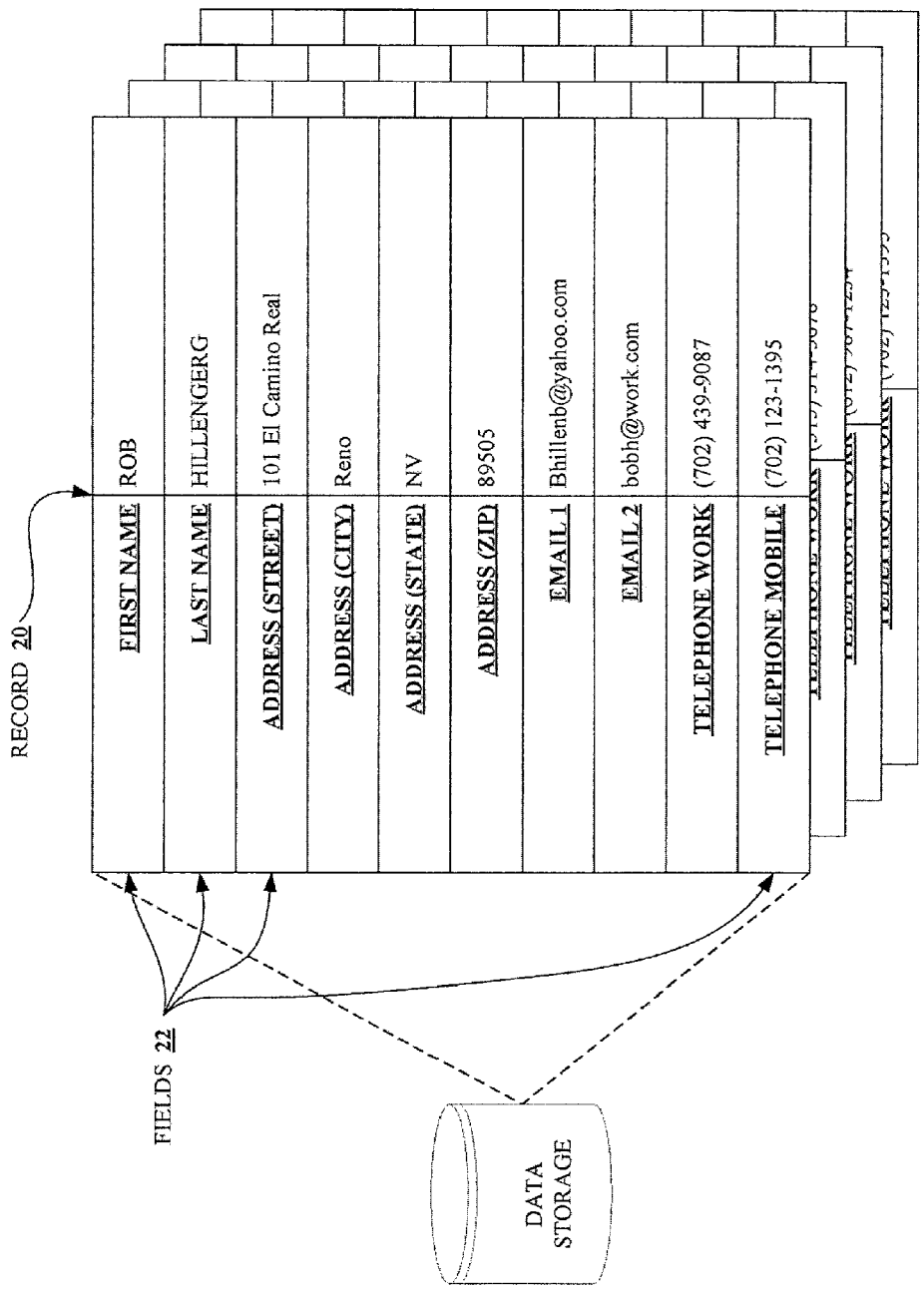
FIG. 2 illustrates an example of a data record with several data fields, according to an embodiment of the invention.

FIG. 2 illustrates an example of a data record 20 with several data fields 22, according to an embodiment of the invention. For example, the data record 20 illustrated in FIG. 2 has separate fields for a first and last name, several fields for an address (e.g., street, city, state, and zip), two individual fields for email addresses, and two additional fields for telephone numbers. Accordingly, the field types for the various fields illustrated in FIG. 2 may be specified as FIRST_NAME, LAST_NAME, ADDRESS_STREET, ADDRESS_CITY, EMAIL__1, and so on. As described in greater detail below, the various fields may be grouped together by type (e.g., name fields, address fields, phone number fields, and so on) to form field groups. Accordingly, in one embodiment of the invention, analysis may be performed on a field group, as opposed to an individual field. In any case, those skilled in the art will appreciate that various devices and software applications support a wide variety of different fields, and field types, with any number of naming conventions. Accordingly, the present invention should not be construed to be limited by the field types or naming conventions illustrated in FIG. 2.

Figure 3:
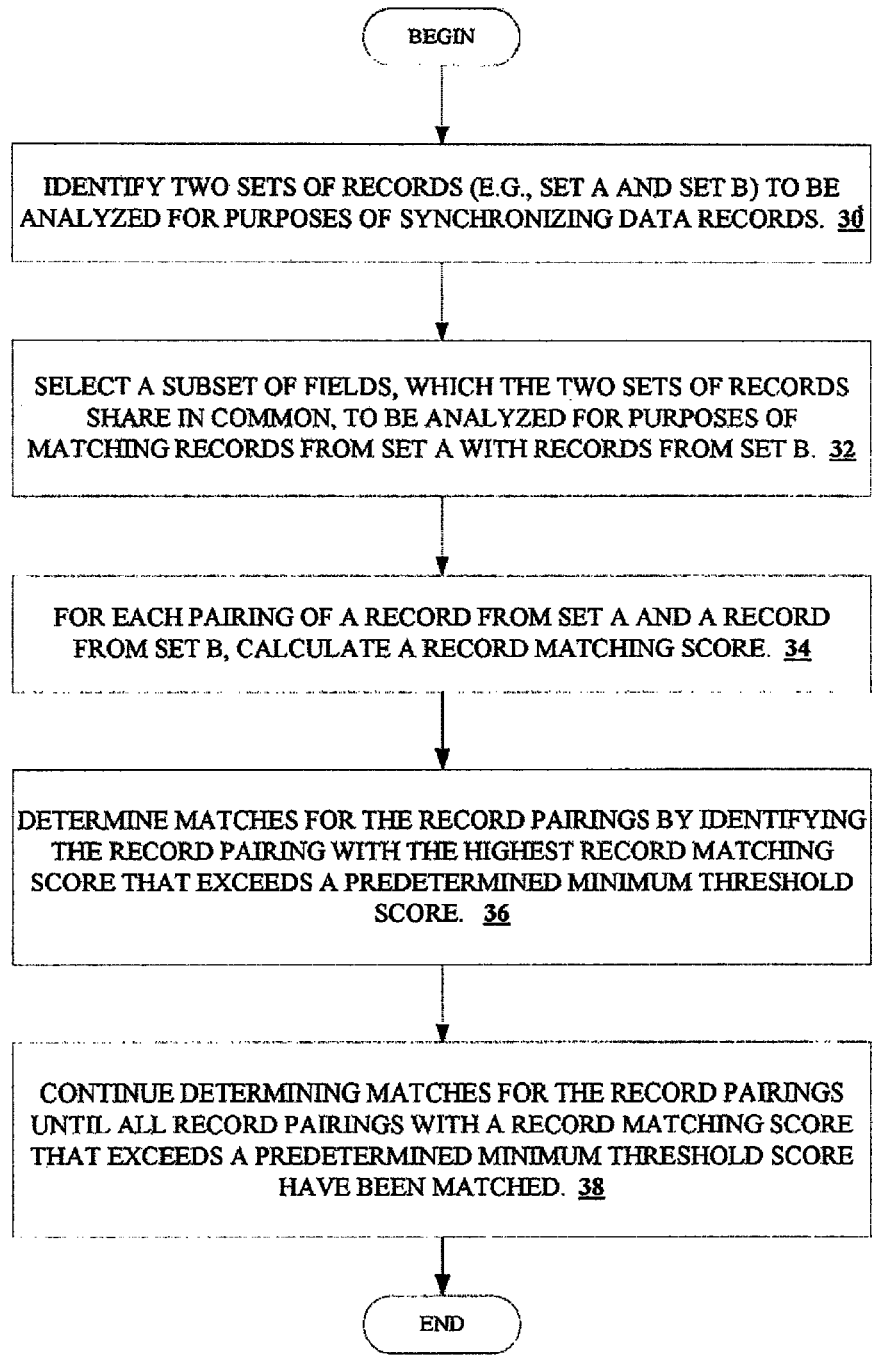
FIG. 3 illustrates an example of a method for identifying matching records in two sets of records according to a matching algorithm consistent with an embodiment of the invention.

FIG. 3 illustrates an example of a method for identifying matching records in two sets of records according to a matching algorithm consistent with an embodiment of the invention. At operation 30 two sets of records (e.g., record set A, and record set B) are identified. For example, a user may initiate a synchronization process on a handset, or the handset may automatically initiate a synchronization process according to a predetermined synchronization schedule. Accordingly, a record set associated with and stored on the handset may be analyzed for purposes of matching records from the handset with records in a second record set at a centralized contact management server 10.

At operation 32, a subset of the fields that the two record sets share in common, is selected. For example, depending on the particular record sets being analyzed, and/or the particular fields included in the record sets, a particular subset (e.g., a group of fields, or multiple groups of fields) of those fields may be selected for purposes of determining a record match. For instance, the matching algorithm may be configured such that those fields that are most likely to indicate whether two records match may be selected for analysis. As described in greater detail below, the individual fields may be organized into groups, such that analysis is performed on a group of fields. For example, if a record has a field for both the first and last name of a person (e.g., FIRST_NAME, LAST_NAME), then the two fields may be grouped together to form a name field for purposes of the field analysis performed by the record matching algorithm. It is possible that a single field may comprise its own group.

Figure 4:
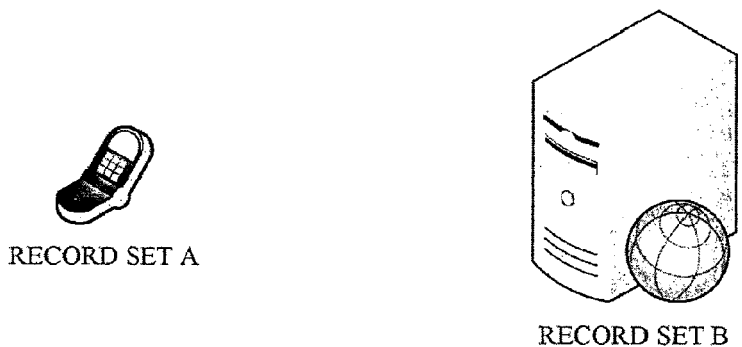
FIG. 4 illustrates an example of how record matching scores are assigned to pairs of records for purposes of determining "matching" records, according to an embodiment of the invention.

Next, at operation 34, for each pairing of a record from the first set and a record from the second set, a record matching score is calculated. For example, as illustrated in FIG. 4, a record from record set A is paired with each record in record set B, and for each pairing, a record matching score is determined. As illustrated in FIG. 4, the record pair (A1, B1)—where A indicates record set A, and 1 indicates record number 1 in the set—has a record matching score of "7," whereas record pair (A1, B2) has a record matching score of "0," and so on.

As illustrated in FIG. 4, the record matching scores, as well as the component scores used to derive the record matching scores, may be normalized to provide a more meaningful score for purposes of comparison with one another. For example, record matching scores may be normalized to fall within a particular range, such as zero through one-hundred, where a score of zero indicates a low likelihood of a record match, and a score of one-hundred indicates a high likelihood of a record match. Similarly, the individual component scores (described in greater detail below) may be normalized, and or scaled.

In one embodiment of the invention, the record matching score for each record pair is recorded for later analysis. Alternatively, in one embodiment of the invention, only those record pairs that have a record matching score that exceeds some predetermined minimum threshold are recorded. For instance, if a record pair has a record matching score that meets or exceeds the threshold score, the record pair (and associated record matching score) may be added to a record matching candidate list. All other record pairings are assumed not to match.

After all record pairs have been analyzed and assigned a record matching score, at operation 36 record matches are determined. For example, in one embodiment of the invention, record matches may be determined by identifying the record pair with the highest record matching score that exceeds the threshold matching score. Once a particular record has been matched with a counterpart, both records in the pair are excluded from the analysis for identifying further matches. Accordingly, after a first match is made, at operation 38 the record pair with the next highest record matching score is identified, and so on, until all record pairs having record matching scores exceeding the threshold matching score are identified.

FIG. 5 illustrates a method for calculating a record matching score, according to an embodiment of the invention. The record matching score assigned to each record pair (e.g., as illustrated in FIG. 4) is based on how well the individual fields (or field groupings) in the record pair correspond or match. Accordingly, at operation 50, fields are grouped, for example, based on a natural grouping. For instance, all fields relating to a person's name may be grouped together to form a name field group. Similarly, all of the address fields may be grouped to form an address field group, and so on. In various embodiments of the invention, the field groupings are configurable, and the actual fields included in any one group may vary. For example, in one embodiment of the invention, one or more fields that would naturally be associated with one group or another, may be excluded from a group, for example, because of a low likelihood of indicating a record match.

At operation 52, for each field group pairing, the individual fields are concatenated to form two strings. For example, all of the name fields in one record are concatenated together, while all the name fields in the corresponding record of the pair are concatenated together. In one embodiment of the invention, the order in which the individual fields are concatenated is dependent upon a byte level comparison of the fields. For example, concatenating the name fields in Record A1 and Record B1 of FIG. 6 results in the two strings, "HILLENBERGROB" and "HILLENBERGROBERT." In this case, the last name "HILLENBERG" is positioned in the string before "ROB" or "ROBERT" because on a byte-level comparison, "H" precedes "R."

Referring again to FIG. 5, at operation 54, for each pair of strings representing a field group pair, a field group matching score is calculated. For instance, referring again to FIG. 6, a field group matching score is determined for the field groups for the name field group 60, address field group 60, email field group 64, and telephone field group 66. The particular method by which a field group matching score is determined is described in greater detail below in connection with the descriptions of FIGS. 7 through 10. In general, a field group matching score has four components: a "uniqueness" component, a "difference" component, a "magnitude" component, and a conflict score.

At operation 56, the field group matching scores for each pair of field groups are combined to determine a record matching score. In one embodiment, each field group may contribute to the record matching score relative to a weighting factor associated with the field group. For example, an email field group may be weighted more heavily than a name field group because a conflict with respect to a name may be attributable to a nickname (e.g., Rob versus Robert), whereas conflicting email addresses are more likely to indicate that the records do not match. Accordingly, in one embodiment of the invention, the fields or field groups that are determined to be most suggestive of a match are given a greater weight than other fields.

FIG. 6 illustrates an example of how a record matching score may be calculated, according to an embodiment of the invention, for a pair of records including record A1, and record B1. As indicated in FIG. 6, the fields for first and last name form one field group. Similarly, the four address fields form yet another field group, as do the email fields, and finally, the telephone fields. Accordingly, the first and last names indicated in record A1 and B1 are combined (e.g., concatenated) to form the strings, "HILLENBERGROB" and "HILLENBERGROBERT." Similarly, the address fields, email fields, and telephone fields are concatenated to form pairs of strings for each field group. Consequently, the record matching score is determined as a combination of the field group matching scores for the four different field groups.

Figure 7:
FIG. 7 illustrates a formula for generating an individual field matching score, according to an embodiment of the invention.

FIG. 7 illustrates a formula 70 for generating an individual field group matching score, according to an embodiment of the invention. As illustrated in FIG. 7, according to one embodiment of the invention, the field group matching score is calculated based on a combination of four components referred to herein as "uniqueness," "difference," "magnitude," and "conflict score." The first three components, "uniqueness," "difference," and "magnitude" are determined based on a string metric known as the Levenshtein Distance. The Levenshtein Distance (hereinafter, "the Distance") between two strings is given by the minimum number of operations needed to transform one string into the other, where an operation is an insertion, deletion, or substitution of a single character.

As illustrated in FIG. 8, the uniqueness score is determined based on the Distance as a percentage of the longer character array. As shown in Example 1 of FIG. 8, the Distance between the two strings "ROB" and "ROBERT" is three. For example, to derive the string "ROB" from the string "ROBERT" requires three character deletions, for the characters "ERT." Accordingly, the uniqueness score is the Distance over the total number of characters in the longer of the two strings—in this case six for the six letters in "ROBERT." Consequently, the uniqueness score the field pair in Example 1 of FIG. 8 is three over six (3/6), or 50%. As illustrated in Example 2, the uniqueness score for the strings "MIKE" and "MICHAEL" is four over seven (4/7), or 57.1%. Finally, in Example 3, the uniqueness score for the strings "FRED" and "BARNEY" is four over six (4/6), or 66.7%. Although the examples shown in FIG. 8 are illustrated on a field by field basis, (e.g., first name fields), in one embodiment of the invention, the uniqueness score, as well as the difference and magnitude scores, calculated for a concatenated string including several fields.

The second component of the field matching score for a field pair is referred to herein as the "difference" component or score. Like the uniqueness score, the difference component is calculated based in part on the Distance. However, the difference score compensates for any difference between the two strings that is solely attributable to the longer length of the long string. Accordingly, the difference score is essentially the Distance, reduced by the number of add operations required to lengthen the shorter of the two strings to equal the size of the longer string.

Figure 9:
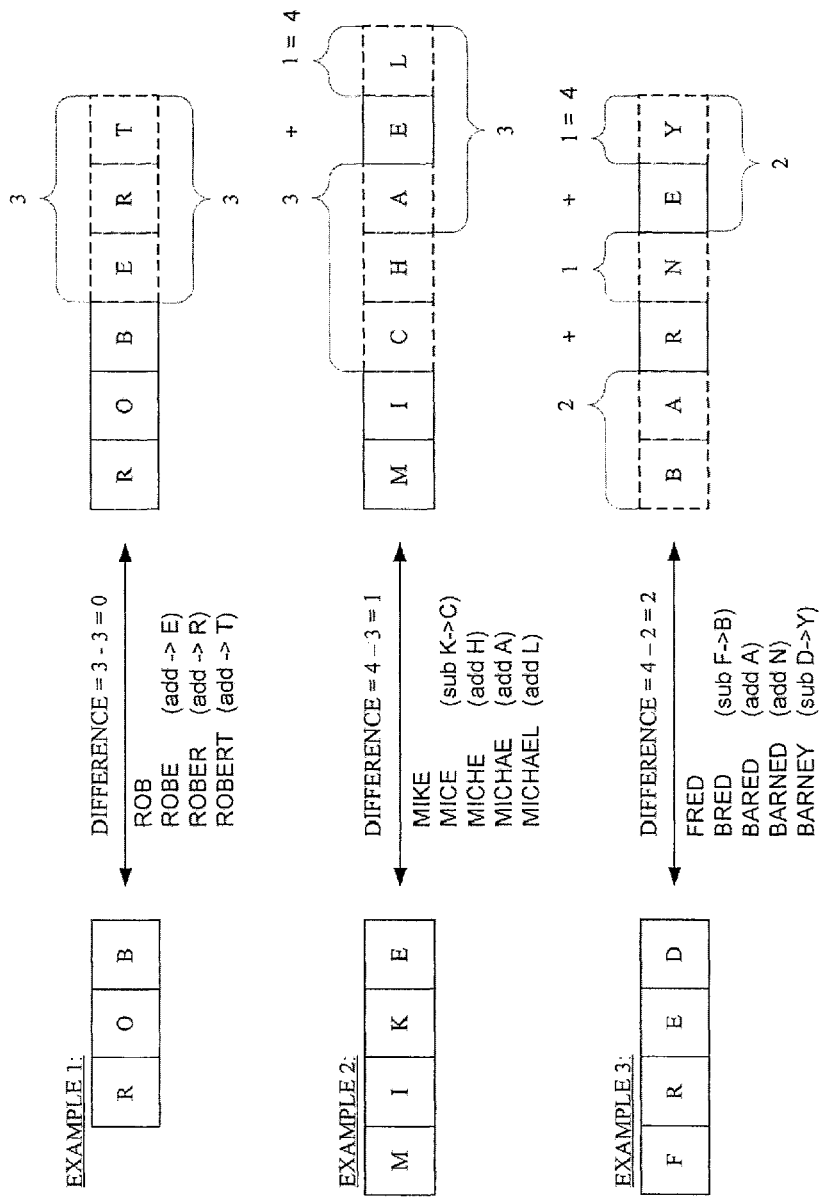
FIG. 9 illustrates various examples of how a difference score is calculated for a grouping of fields, according to an embodiment of the invention.

As illustrated in Example 1 of FIG. 9, the difference score for the strings "ROB" and "ROBERT" is zero, as the difference between the two strings is solely attributable to the extra characters, "ERT," of the longer string. In Example 2, the difference score is one. Of the four operations required to transform the string "MIKE" to "MICHAEL," three of the operations are necessary to add characters (e.g., "H," "A" and "L"). Finally, the difference score for the two strings shown in Example 3—"FRED" and "BARNEY"—is two. Of the four operations required to convert the shorter string to the longer string, two of the operations are for adding the characters to the shorter string to equal the length of the longer string. Accordingly, two is subtracted from the Distance, four, to arrive at a difference score of two.

Figure 10:
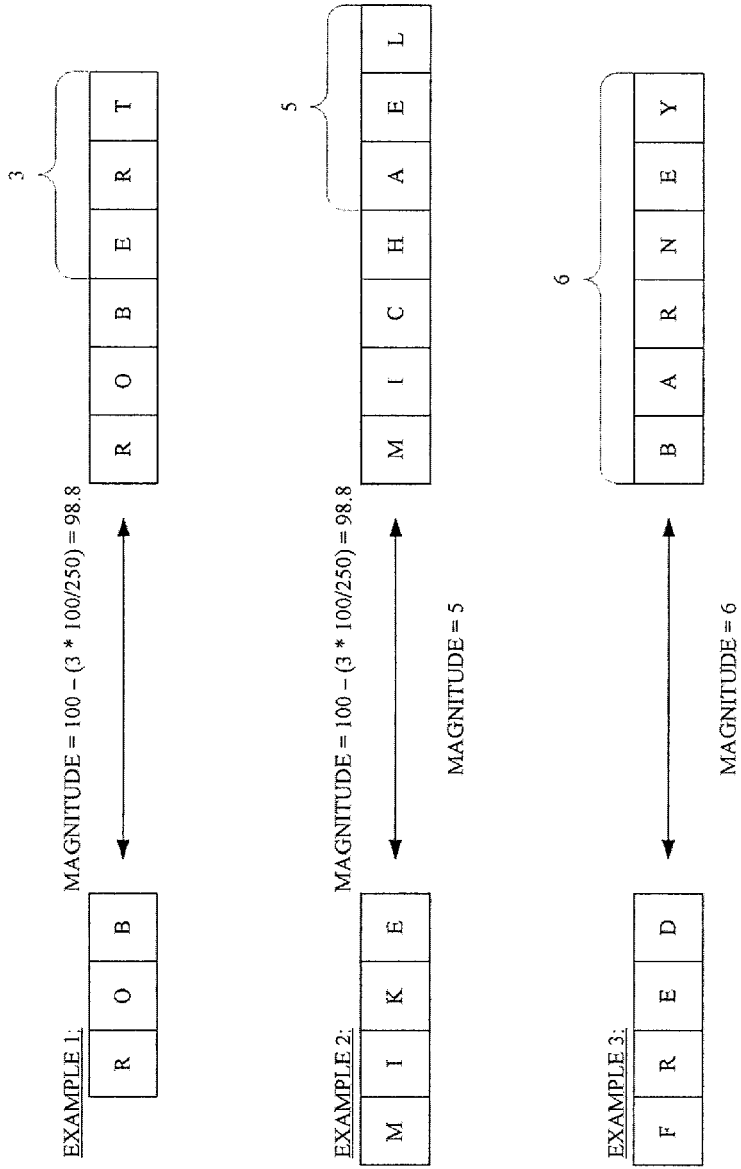
FIG. 10 illustrates various examples of how a magnitude score is calculated for a grouping of fields, according to an embodiment of the invention.

The third component of the field matching score is referred to as the magnitude component or score. The magnitude score takes into consideration the absolute difference in the size of the two strings being compared. In one embodiment, the magnitude score is calculated by normalizing the Levenshtein Distance as shown in FIG. 10. For instance, as illustrated in Example 1 of FIG. 10, the Distance for the strings "ROB" and "ROBERT" is three. By setting the upper bound of Distances to two-hundred fifty, and then normalizing the Distance on a scale of zero to one-hundred, the magnitude for the strings in Example 1 is equal to 98.8. As illustrated in Examples 2 and 3 of FIG. 10, the magnitude scores in those Examples is 98.4. If two strings had a Distance score greater than two-hundred fifty, the magnitude is automatically set to zero. Of course, in various embodiments of the invention, the upper and lower bounds may be different, and the scale may be something other than from zero to one-hundred.

The fourth and final component comprising a field matching score is referred to as a conflict score. In contrast to the first three components—uniqueness, difference and magnitude—the conflict score is generally calculated on a field by field basis. For instance, in one embodiment of the invention, the conflict score is simply a combination of the uniqueness, difference, and magnitude scores calculated individually for each field in a group. For example, for the name field group, the uniqueness, difference, and magnitude scores are calculated for the first name field, and again for the last name field. Then, the two calculated scores are combined to form a conflict score for the field group. Thus, the field matching score for a field group is based on the uniqueness, difference and magnitude score, calculated for the group (e.g., the concatenated string), and the conflict score, which is calculated by combining the uniqueness, difference and magnitude scores calculated for each individual pairing of common fields in the group (e.g., first name fields, last name fields).

In one embodiment of the invention, the field matching scores and/or the record matching scores may be normalized, so as to enable more meaningful comparisons. For instance, the record matching score for each record pair may be normalized to a score between zero and one-hundred, where one-hundred indicates a perfect match. Also, as described above, the algorithm may be configurable to provide different weightings.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as instructions stored on a computer- or machine-readable medium. In general, the scope of the invention is defined by the claims and their equivalents.

What is claimed is:

1. A computer implemented method comprising:
identifying first and second different record sets;
identifying a subset of fields shared in common by records of the first and second different record sets;
for each pairing of a subject record from the first record set and a subject record from the second different record set, calculating, based on the subset of fields selected, a record matching score including determining a field score for each field in the subset of fields, wherein the field score for a field for a pairing is based on one or more of uniqueness component, a difference component, a magnitude component or a conflict component and wherein the matching score is based at least in part on the respective field scores for a respective pairing;
identifying a pair having a highest record matching score over a threshold as a matched record pair;
excluding records of matched record pairs from further analysis, and successively identifying further matching record pairs according to their associated record matching scores and excluding such matching record pairs from further analysis until all record pairs having record matching scores exceeding the threshold are identified; and
determining, by one or more processors, records in the second different record set that match records in the first record set based on the excluding.

2. The computer implemented method of claim 1, wherein the method is initiated at a handset.

3. The computer implemented method of claim 1, wherein the method is initiated at a mobile device.

4. The computer implemented method of claim 1, wherein the method is initiated at a source record device.

5. The computer implemented method of claim 1, wherein the method is initiated according to a schedule.

6. The computer implemented method of claim 1, wherein the subset of fields in each subject record pair comprises fields of records of the first and second different record sets most likely to indicate whether individual records of the first and second different record sets match one another.

7. The computer implemented method of claim 1, wherein prior to the identifying of the matching records of the first record set and the second record set, scores of each component of each record of each record pair are normalized before the record matching scores of said each record pairs are derived.

8. A computer program product stored on a non-transitory media comprising instructions that when executed by a processor cause the processor to:

initiate a synchronization process over a computer network;

responsive thereto, analyze a first record set to match records of the first record set with records of a second record set maintained remotely from the first record set;

select a subset of fields shared in common by records of the first and second record sets to determine a record match;

for each pairing of a subject record from the first record set and a subject record from the second record set, calculate, based on the subset of fields selected, a record matching score, wherein said each pairing of a subject record from the first record set and a subject record from the second record set comprises a record pair, the record matching scores are calculated based on how well individual fields of the subset of fields in each subject record pair compare, wherein the individual fields of the subset of fields in each subject record pair comprise field group pairings, wherein how well individual fields of the subset of fields in each subject record pair are compared based on a field score for each field in the subset of fields, wherein the field score for a field for a pairing is based on one or more of uniqueness component, a difference component, a magnitude component or a conflict component and wherein the record matching score is based at least in part on the respective field scores for a respective pairing;

identify the matching records of the first record set and the second record set by identifying record pairs having a highest record matching score over a threshold;

exclude identified matched record pairs from further analysis, and successively identifying further matching record pairs according to associated record matching scores of the further matching record pairs and excluding the further matching record pairs from further analysis until all record pairs having record matching scores exceeding the threshold are identified; and determining records in the second different record set that match records in the first record set based on the excluding.

9. A system comprising:

a first data storage that includes a first record set;

a second data storage that includes a second different record set;

a synchronization engine including a server configured to:

analyze the first record set to match records of the first record set with records of the second different record set maintained remotely from the first record set;

select a subset of fields shared in common by the records of the two record sets to determine a record match;

for each pairing of a subject record from the first record set and a subject record from the second record set, calculate, based on the subset of fields selected, a record matching score, wherein said each pairing of a subject record from the first record set and a subject record from the second record set comprises a record pair, the record matching scores are calculated based on how well individual fields of the subset of fields in each subject record pair compared, wherein the individual fields of the subset of fields in each subject record pair comprise field group pairings, wherein how well individual fields of the subset of fields in each subject record pair are compared based on a field score for each field in the subset of fields, wherein the field score for a field for a pairing is based on one or more of uniqueness component, a difference component, a magnitude component or a conflict component and wherein the record matching score is based at least in part on the respective field scores for a respective pairing;

identify the matching records of the first record set and the second record set by identifying record pairs having a highest record matching score over a threshold;

exclude identified matched record pairs from further analysis, and successively identifying further matching record pairs according to associated record matching scores of the further matching record pairs and excluding the further matching record pairs from further analysis until all record pairs having record matching scores exceeding the threshold are identified; and determining records in the second different record set that match records in the first record set based on the excluding.

\* \* \* \* \*